US012727546B2

(12) United States Patent
Centenaro

(10) Patent No.: US 12,727,546 B2
(45) Date of Patent: Sep. 8, 2026

(54) ADJUSTMENT AND RELEASE UNIT FOR A CONCAVE OF A THRESHING SYSTEM OF A COMBINE HARVESTER

(71) Applicant: AGCO International GmbH, Neuhausen (CH)

(72) Inventor: Murillo Centenaro, Breganze (IT)

(73) Assignee: AGCO International GmbH, Neuhausen (CH)

( * ) Notice: Subject to any disclaimer, the term of this patent is extended or adjusted under 35 U.S.C. 154(b) by 113 days.

(21) Appl. No.: 18/507,316

(22) Filed: Nov. 13, 2023

(65) Prior Publication Data

US 2024/0172596 A1 May 30, 2024

(30) Foreign Application Priority Data

Nov. 24, 2022 (GB) ...................................... 2217576

(51) Int. Cl.
*A01F 12/28* (2006.01)

(52) U.S. Cl.
CPC .................................... *A01F 12/28* (2013.01)

(58) Field of Classification Search
CPC ....................................................... A01F 12/28
See application file for complete search history.

(56) References Cited

U.S. PATENT DOCUMENTS

| | | | | |
|---|---|---|---|---|
| 7,393,274 B2 * | 7/2008 | Voss | A01F 12/28 460/109 |
| 10,932,414 B2 * | 3/2021 | Haar | A01F 12/28 |
| 2011/0151950 A1 | 6/2011 | Regier et al. | |
| 2014/0308998 A1 * | 10/2014 | Bergkamp | A01F 12/28 460/107 |
| 2019/0254233 A1 * | 8/2019 | Kemmerer | A01F 12/28 |

FOREIGN PATENT DOCUMENTS

| | | | | |
|---|---|---|---|---|
| CN | 112293064 A | 2/2021 | |
| CN | 218125603 U | 12/2022 | |
| DE | 4321272 C1 * | 1/1995 | A01F 12/28 |
| EP | 0092599 A1 * | 11/1983 | A01F 12/28 |
| EP | 3087824 A1 * | 11/2016 | A01D 41/06 |
| GB | 1379808 A | 1/1975 | |

OTHER PUBLICATIONS

English translation of DE-4321272-C1 (Year: 1995).*
English translation of EP-0092599-A1 (Year: 1983).*
UK Intellectual Property Office, Search report for related UK Application No. GB2217576.4, dated May 18, 2023, 4 pages.

* cited by examiner

*Primary Examiner* — Claude J Brown

(57) ABSTRACT

A spring release function is provided for releasing the concave of the threshing system of a combine harvester, to allow large objects to be released from the space between the threshing rotor and concave. An adjustment and release unit supports the concave beneath a threshing unit and has a rotary control shaft, an actuator for controlling an angular position of the rotary control shaft, and a set of concave support arms which extend downwardly from the rotary control shaft to the concave. A linkage including the actuator also has a series spring arrangement for releasing the concave.

7 Claims, 7 Drawing Sheets

ADJUSTMENT AND RELEASE UNIT FOR A CONCAVE OF A THRESHING SYSTEM OF A COMBINE HARVESTER

CROSS-REFERENCE TO RELATED APPLICATION

This application claims the benefit of the filing date of United Kingdom Patent Application 2217576.4, “An Adjustment and Release Unit for a Concave of a Threshing System of a Combine Harvester,” filed Nov. 24, 2022, the entire disclosure of which is incorporated herein by reference.

FIELD

Embodiments of the present disclosure relate generally to combine harvesters, and in particular to a mechanism for releasing the concave of a threshing or separating system of the combine harvester.

BACKGROUND

A combine harvester typically includes a threshing system for detaching grains of cereal from the ears of cereal, a separating apparatus downstream of the threshing system, and a grain cleaning apparatus for receiving grain from the separating apparatus. A stratification pan aims to stratify the material into a layered structure of grain at the bottom and light chaff and other material other than grain (MOG) at the top.

There are various designs for the threshing system and for the separating apparatus (e.g. axial or transverse) as well as for the grain cleaning apparatus. However, in all designs, there is a flow of material from the threshing system to the separating apparatus, and between the separating apparatus and the grain cleaning unit, in particular from the stratification pan to the grain cleaning unit. The flow can either pass from the stratification pan directly to the grain cleaning unit or there may an intermediate cascade pan between the stratification pan and the grain cleaning unit.

The threshing system typically comprises threshing rotors that rotate with respect to concave gratings (known simply as “concaves”). As mentioned above, the threshing rotors may be arranged transversally or longitudinally with respect to the direction of travel of the combine harvester.

The distance between the concaves and the rotors is adjustable, so that the threshing system may be configured for different crop types and harvesting conditions. A safety mechanism is also used to protect the combine when dense swathes of crops or large rigid objects enter the machine, such as stones or pieces of metal or wood or just wet clumps of crop material.

Traditionally, a shear-bolt system is installed. When a large object enters the space between a rotor and a concave, the instantaneous force breaks the bolt, and the concave falls away (i.e. is released) from the rotor, so as to prevent damage.

It has been proposed in EP 3 178 309 to provide a resettable spring-biased system for releasing the concave from the rotor to allow large objects to pass. This avoids the need to stop the combine harvester and replace the shear-bolt whenever a breakage occurs. This reduces downtime. However, this solution requires a complex additional mechanism, adding cost and complexity. The resetting of the release mechanism is a manual process (for safety reasons) which also takes time and skill.

US 2019/0254233 discloses a concave support and adjustment system, in which a torsion bar has a main section coupled to a drive to adjust a frame position, and additional sections of the torsion bar are rotatably coupled to the main section via pneumatic springs. These additional sections connect to the concave frame. This requires a segmented torsion bar and significantly complicates the design of the concave support system.

There is therefore a need for an improved release mechanism for releasing the concave of a threshing system from a threshing rotor.

BRIEF SUMMARY

The invention is defined by the claims. According to examples in accordance with a first aspect of the invention, there is provided an adjustment and release unit for supporting a concave beneath a threshing unit of a combine harvester, the adjustment and release unit comprising:

- a rotary control shaft;
- an actuator for controlling an angular position of the rotary control shaft;
- a set of concave support arms which extend downwardly from the rotary control shaft to the concave, wherein an angular orientation of the rotary control shaft determines a depth of the concave beneath the adjustment and release unit; and
- a linkage between the rotary control shaft and a mounting point, the linkage incorporating the actuator,
- wherein the linkage further comprises a spring arrangement in series with the actuator for releasing the concave in response to foreign objects entering the threshing unit against a spring bias of the spring arrangement.

This adjustment and release unit uses a spring to release the concave when an excessive force is experienced, due to a foreign object entering the grain processing system of a combine. A force experienced at the crop is transferred to the rotary control shaft, and to protect the rotary control shaft there is damping in series with the actuator which drives the rotary control shaft. In this way, the support arms can all be of constant fixed length, so that the release of the concave provides a uniform change in height of the concave along its length (where the length is parallel with the rotation axis of the associated rotor/cylinder). It also means that a single spring arrangement may be used for the whole concave. This adjustment and release unit is able to adjust the concave height by means of the actuator as well as providing a safety release function.

There are for example at least two concave support arms for supporting the concave along its length. Thus, the concave is maintained level by the support arms, and only one spring system is needed to allow the whole concave to release i.e., open.

The spring arrangement is in series with the actuator.

The spring arrangement is between the rotary control shaft (i.e. the shaft driven by the actuator) and the actuator or it may be between the actuator and the fixed mounting point. The fixed mounting point is for example the chassis of a combine.

The actuator for example comprises a piston, such as a hydraulic piston. It is driven to rotate the rotary control shaft, and thereby adjust the concave height. However, the spring arrangement avoids a rigid connection and thereby allows concave movement when an experienced force exceeds a threshold, and is thereby sufficient to compress or extend the spring arrangement to allow rotation of the rotary control shaft even with no change in actuated drive level.

The spring arrangement for example comprises at least one spring positioned parallel with, and to the side of, the hydraulic piston. In this way, the spring arrangement does not take up significant extra space because it is positioned alongside the actuator hydraulic piston. However, functionally, the spring is in series with the actuator.

The spring arrangement may comprise a spring housing which houses the at least one spring, wherein the spring housing has a first end connected to one end of the hydraulic piston, wherein, for the or each spring, a coupling rod extends through the spring to the first end of the spring housing, and the coupling rod connects to the rotary control shaft at the first end of the spring housing. Thus, connections are made to the actuator and to the rotary control shaft at a same end of the spring housing, thereby making a compact arrangement. Thus, although the spring arrangement is in series with the actuator, it takes up much less linear space than the length of the spring or springs.

The control linkage and one of the concave support arms for example both connect to the rotary control shaft at a shared crank. Again, this makes the overall set of components compact.

The spring arrangement for example comprises two springs in parallel with each other. There may be one on each side of the hydraulic piston.

The invention also provides a threshing system for a combine harvester, comprising:

a threshing unit;

a concave beneath the threshing unit; and the adjustment and release unit as defined above for supporting the concave beneath the threshing unit.

The invention also provides a combine harvester comprising:

a crop cutting head;

the threshing system as defined above; and a grain cleaning system for receiving the cut and threshed crop material.

BRIEF DESCRIPTION OF THE DRAWINGS

One or more embodiments of the invention/disclosure will now be described, by way of example only, with reference to the accompanying drawings, in which.

DETAILED DESCRIPTION

Figure 1:
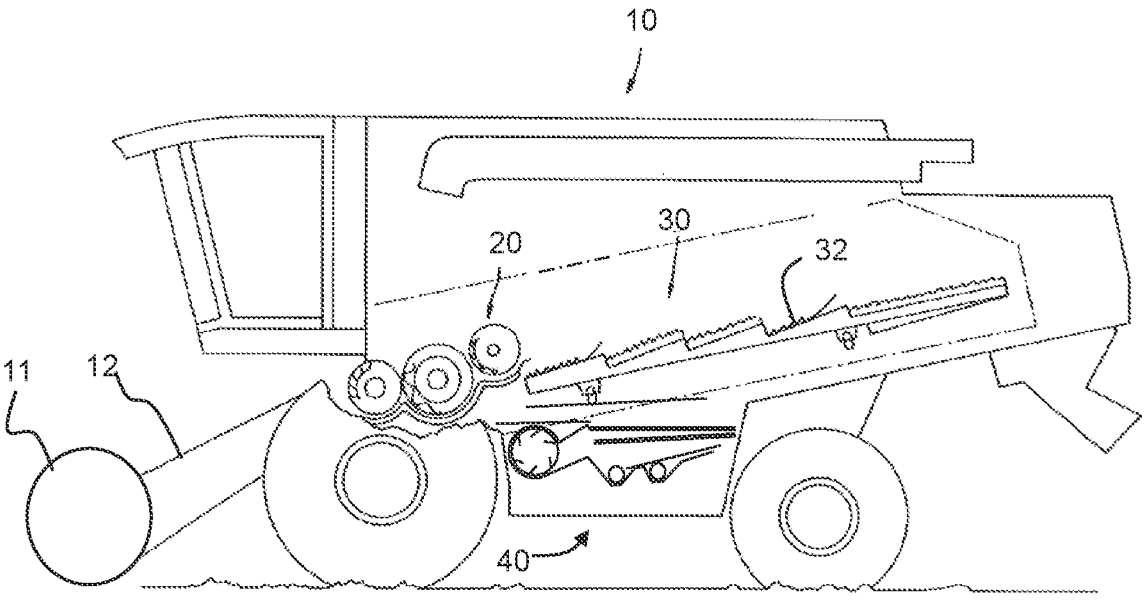
FIG. 1 shows a combine harvester which may be adapted in accordance with the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

This disclosure in relates to the design of a release unit for releasing the concave of a threshing system, to allow large objects to be released from the space between the threshing rotor and concave. An adjustment and release unit supports the concave beneath a threshing unit and has a rotary control shaft, an actuator for controlling an angular position of the rotary control shaft, and a set of concave support arms which extend downwardly from the rotary control shaft to the concave. A linkage including the actuator also has a series spring arrangement for releasing the concave.

FIG. 1 shows a known combine harvester 10 to which the invention may be applied. A crop cutting head 11 (known as the header) for example comprises a wide laterally extending transverse auger, which cuts the crop material and drives it inwardly towards a central area. A front elevator housing 12 receives the cut crop material and includes a feederhouse for transporting the crop material.

The feederhouse delivers the crop material to a threshing system 20 for detaching grains of cereal from the ears of cereal, and a separating apparatus 30 which is connected downstream of the threshing system 20. The threshing system comprises one or more threshing units, in particular rotors, and associated concaves.

In the example shown, the separating apparatus 30 includes a plurality of parallel, longitudinally-aligned, straw walkers 32, and this is suitable for the case of a so-called straw-walker combine. The grains after separation by the separating device 30 pass to a grain cleaning apparatus 40.

In the example shown, the threshing system 20 is a tangential-flow 'conventional' threshing system, i.e. formed by rotating elements with an axis of rotation in the side-to-side direction of the combine harvester and for generating a tangential flow. For example, the 'conventional' threshing system includes a rotating, tangential-flow, threshing cylinder and a concave-shaped grate. The threshing cylinder includes rasp bars (not shown) which act upon the crop stream to thresh the grain or seeds from the remaining material, the majority of the threshed grain passing through the underlying grate and onto a stratification pan (also sometimes known as the grain pan).

There are also axial threshing systems, i.e. formed by rotating elements with an axis of rotation in the longitudinal direction (direction of travel). For example, the threshing section may have axially-aligned rasp bars spaced around the front section whilst the separating section has separating elements or fingers arranged in a pattern, e.g. a spiral pattern, extending from the rasp bars to the rear of the rotor.

Figure 2:
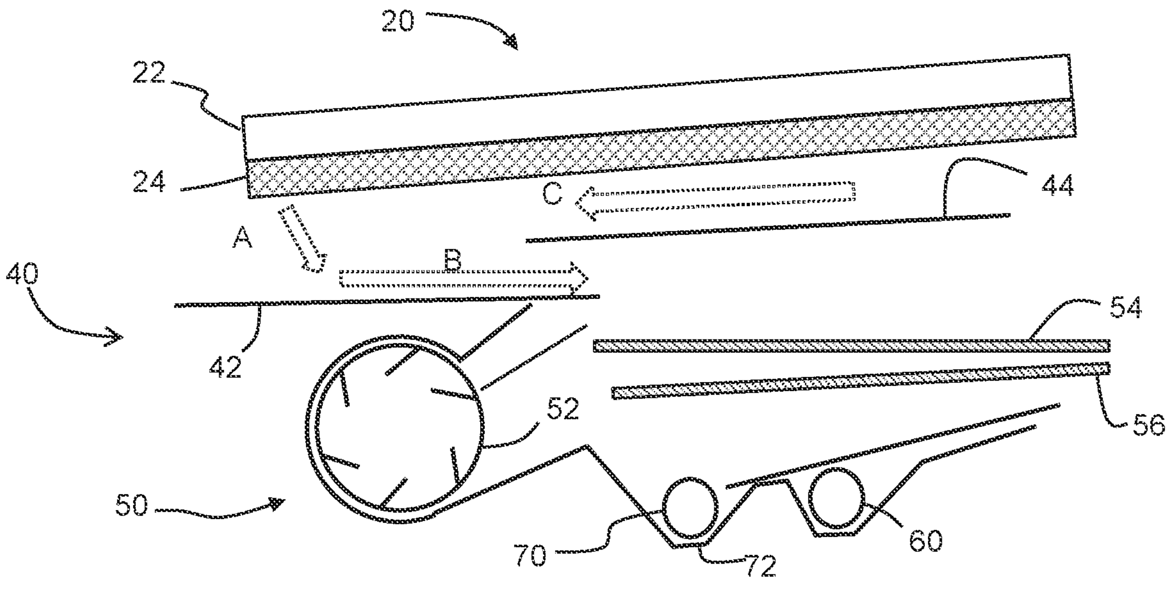
FIG. 2 shows one example of threshing system and grain cleaning apparatus in more detail.

An axial threshing (and separating) system 20 is shown in FIG. 2, together with a cleaning apparatus 40.

The threshing system 20 comprises an axial rotor 22 beneath which is mounted the concave 24. The concave may have different sections along its length, and the first section to receive the crop material (to the left in FIG. 2) may have a releasable concave, or else the whole length of the concave may be releasable. The separating function involves conveying the crop stream rearwardly in a ribbon passing along a spiral path.

The initial threshing creates a flow of grain to a stratification pan 42. The separating function further downstream of the threshing system serves to separate further grain from the crop stream and this separated grain passes through a grate-like structure onto an underlying return pan 44. The residue crop material, predominantly made up of straw, exits the machine at the rear. Although not shown in FIG. 1, a straw spreader and/or chopper may be provided to process the straw material as required.

The threshing apparatus 20 does not remove all material other than grain, "MOG", from the grain so that the crop stream collected by the stratification pan 42 and return pan 44 typically includes a proportion of straw, chaff, tailings and other unwanted material such as weed seeds, bugs, and tree twigs. The remainder of the grain cleaning apparatus 40 is in the form of a grain cleaning unit 50. The grain cleaning unit 50 removes this unwanted material thus leaving a clean sample of grain to be delivered to the tank.

The grain cleaning unit 50 comprises a fan unit 52 and sieves 54 and 56. The upper sieve 54 is known as the chaffer.

The stratification pan 42 and return pan 44 are driven in an oscillating manner to convey the grain and MOG accordingly. Although the drive and mounting mechanisms for the stratification pan 42 and return pan 44 are not shown, it should be appreciated that this aspect is well known in the art of combine harvesters and is not critical to disclosure of the invention. Furthermore, it should be appreciated that the two pans 42, 44 may take a ridged construction as is known in the art.

The general flow of material is as follows. The grain passing through the concave 24 falls onto the front of stratification pan 42 as indicated by arrow A in FIG. 2. This material is conveyed rearwardly (in the direction of arrow B in FIG. 2) by the oscillating motion of the stratification pan 42 and the ridged construction thereof. Material passing through the concave further back falls onto the return pan 44 and is conveyed forwardly by the oscillating motion and ridged construction thereof as shown by arrow C.

It is noted that "forwardly" and "rearwardly" refer to direction relative to the normal forward direction of travel of the combine harvester.

When the material reaches a front edge of the return pan 44 it falls onto the stratification pan 42 and is conveyed as indicated by arrow B.

The combined crop streams thus progress rearwardly towards a rear edge of the stratification pan 42. Whilst conveyed across the stratification pan 42, the crop stream, including grain and MOG, undergoes stratification wherein the heavier grain sinks to the bottom layers adjacent stratification pan 42 and the lighter and/or larger MOG rises to the top layers.

Upon reaching the rear edge of the stratification pan 42, the crop stream falls onto the chaffer 54 which is also driven in a fore-and-aft oscillating motion. The chaffer 54 is of a known construction and includes a series of transverse ribs or louvers which create open channels or gaps therebetween. The chaffer ribs are angled upwardly and rearwardly so as to encourage MOG rearwardly whilst allowing the heavier grain to pass through the chaffer onto an underlying second sieve 56.

The chaffer 54 is coarser (with larger holes) than second sieve 56. Grain passing through chaffer 54 is incident on the lower sieve 56 which is also driven in an oscillating manner and serves to remove tailings from the stream of grain before being conveyed to on-board tank (not shown) by grain collecting auger 70 which resides in a transverse trough 70 at the bottom of the grain cleaning unit 50. Tailings blocked by sieve 56 are conveyed rearwardly by the oscillating motion thereof to a rear edge from where the tailings are directed to the returns auger 60 for reprocessing in a known manner.

This disclosure relates to the design of the threshing system, and in particular it relates to a function of opening the space between the threshing rotor and the concave beneath, to prevent blockage.

A blockage results in overload in the threshing system and can be caused by foreign objects such as stones (that have passed a stone trap), or simply by high moisture crop lumps which are especially found in grass seed and spring barley.

The invention will be described with reference to an axial threshing (and separating) system, although it will be appreciated that the same concepts may be applied to a transverse threshing system.

Figure 3:
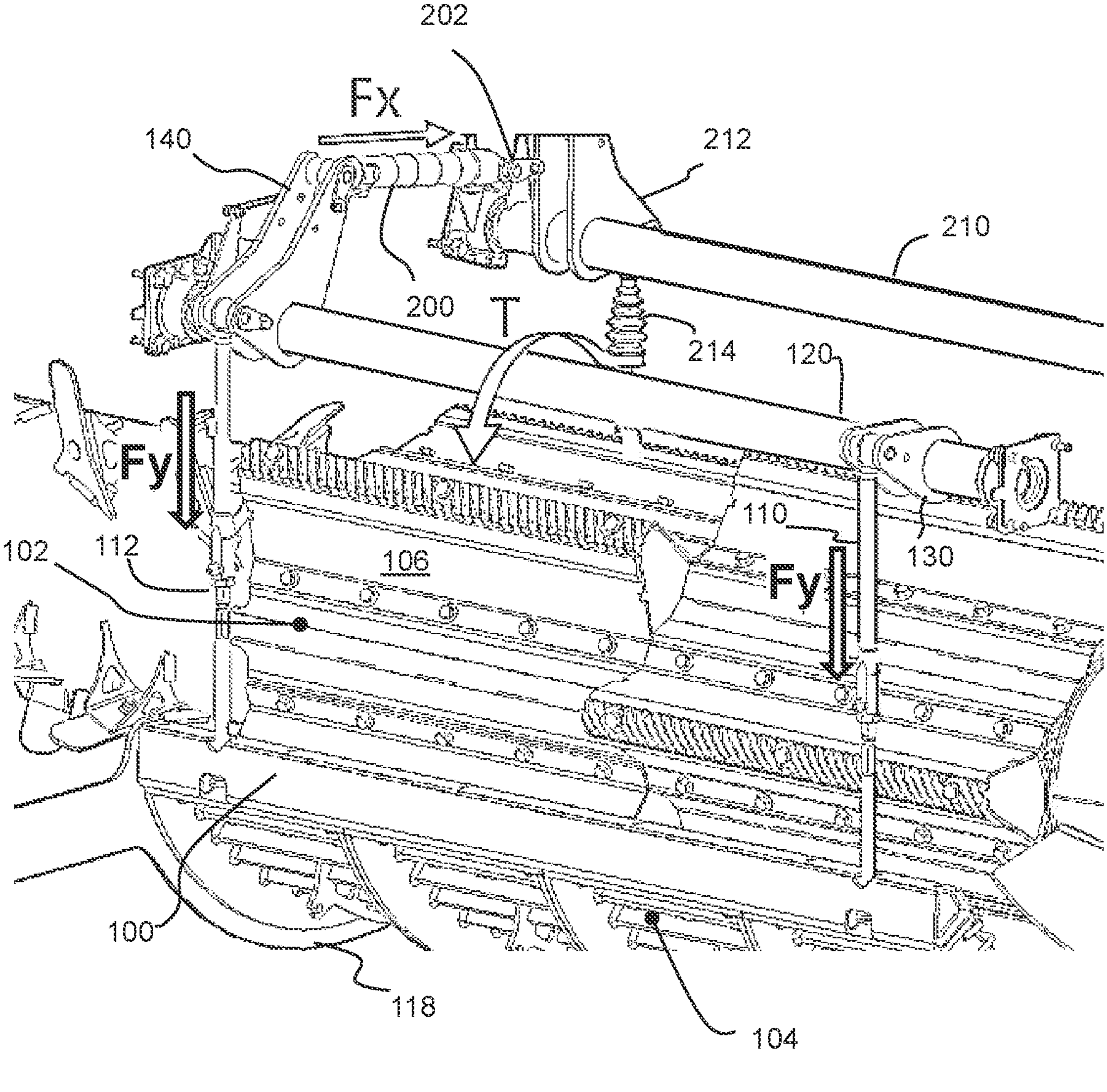
FIG. 3 shows a control mechanism for a concave, positioned beneath a threshing rotor.

FIG. 3 shows part of the threshing system, in particular a part that controls the position of the concave, and hence the spacing between the concave and the threshing rotor, in a known axial system. FIG. 3 shows a single rotor design, but there are also twin rotor designs, with two rotors and two concave arrangements side-by-side.

FIG. 3 shows a design without any release function, and the invention may be applied as a modification to the design of FIG. 3 to implementing such a release function. FIG. 3 shows a single concave positioned beneath a respective threshing rotor.

The concave is supported at an inlet side (seen in FIG. 3) and an outlet side (mainly hidden in FIG. 3). A threshing rotor 102 is supported above the concave 104, and the threshing rotor has paddles 106 for driving the crop material axially along the length of the rotor, in this example.

The inlet side 100 of the concave is suspended by a pair of concave support arms 110,112 in the form of vertical rods. By adjusting the height of the vertical rods, the position of the concave relative to the threshing rotor is adjustable. The shape of the concave 104 can be seen more clearly from the shape of a connecting bar 118.

A rotary control shaft 120 (known as the rockershaft) is used to control the height of the pair of concave support arms. Each support arm connects to a crank 130, 140 which rotates with the rotary control shaft 120. The control shaft is a rigid single-section shaft extending along the length of the concave.

The rotary control shaft 120 for example has a first crank 130 at one end and a second crank 140 at the other end. The first crank 130 is a simple passive unit, which directly converts the angular position of the first rotary control shaft 120 into a vertical height. The second crank 140 is actively driven, and it connects to both a respective support arm 112 and also to an actuator 200. The actuator 200 is for example a hydraulic cylinder.

A second rotary control shaft 210 is used to control the height of the outlet side. One crank 212 is shown as well as a concave support arm 214 extending downwardly from the crank 212. A dust boot is seen on the support arm 214—dust boots are in practice on all support arms but they are not shown in arms 110, 112 to improve clarity. The height of the inlet and outlet sides of the concave are adjusted together, by separate but functionally identical actuator systems. The actuator for the outlet side is not shown in FIG. 3.

The actuator 200 connects to a fixed point 202, i.e., coupled to the chassis of the combine.

The actuator 200 and the actuator for the outlet side can be used to set a current default spacing between the concave and the threshing rotor. Thus, the inlet side and the outlet side may be set to a default height by adjusting the angular orientation of the rotary control shafts to adjust the opposite sides of the concave.

Figure 4:
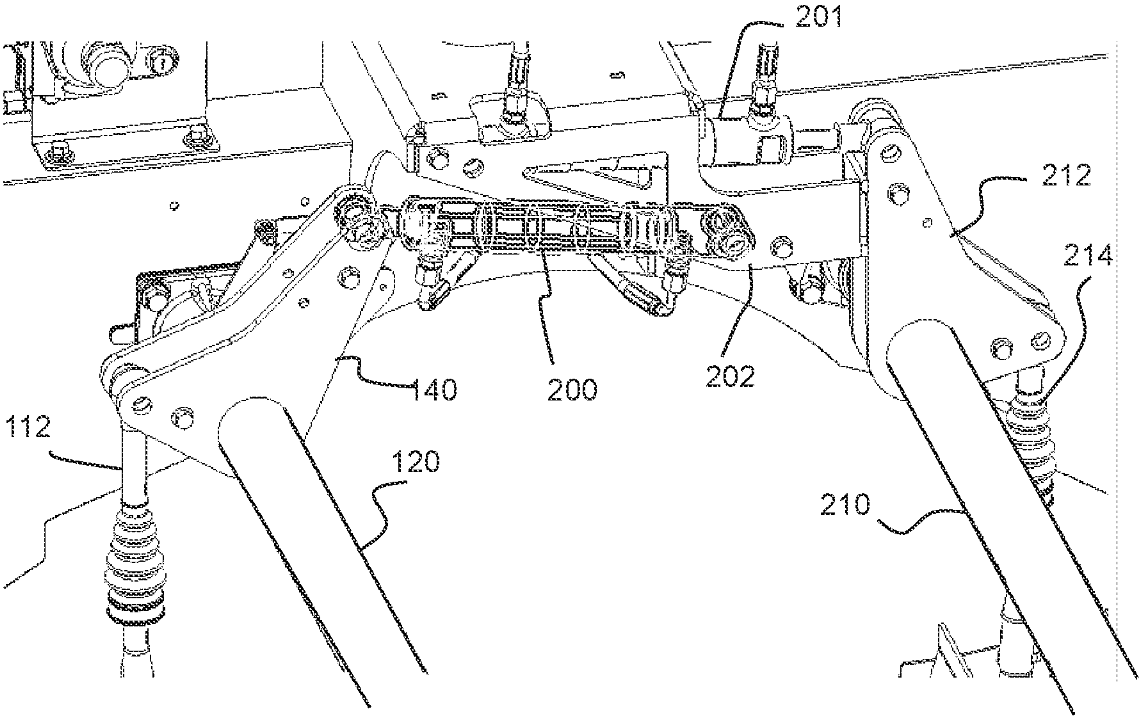
FIG. 4 shows the control mechanism from a different angle.

FIG. 4 shows the actuation system from a different angle. It also shows the second actuator 201 for the outlet side, for rotating the second rotary control shaft 210 via the crank 212.

Figure 5:
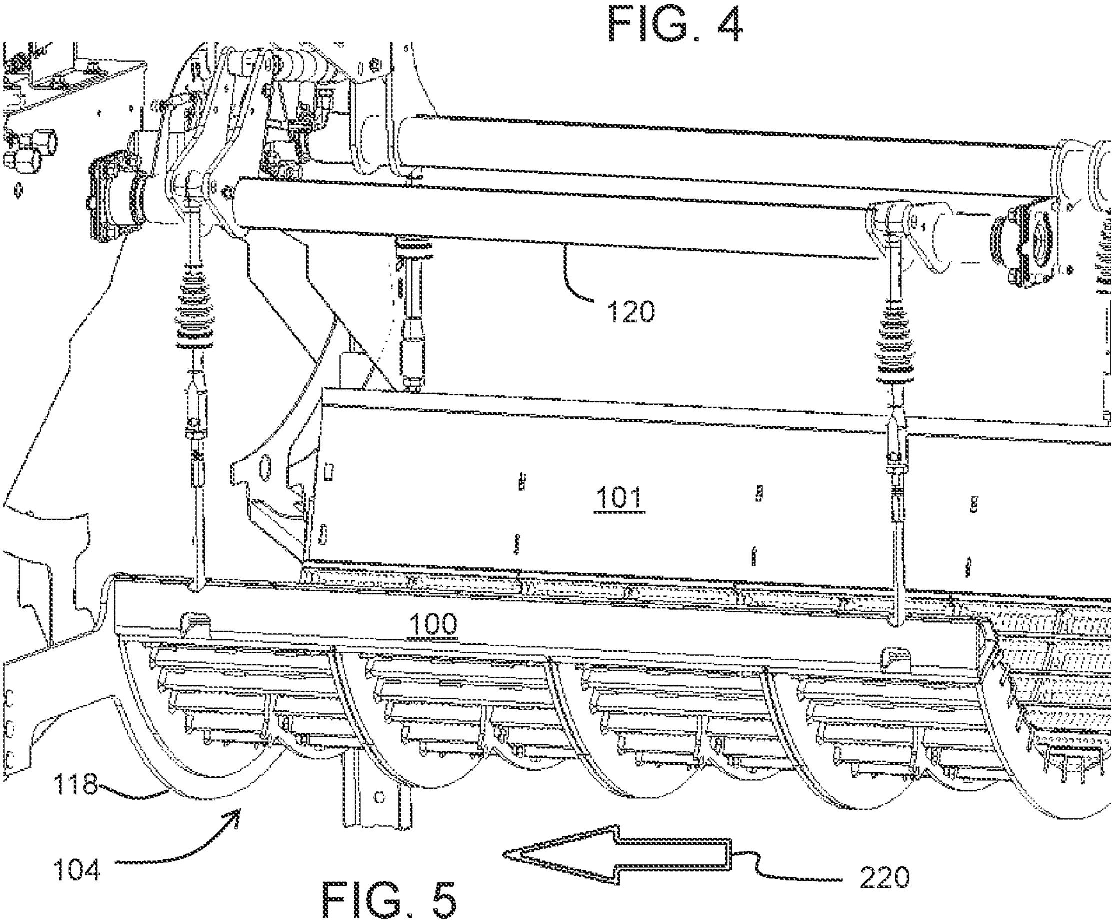
FIG. 5 shows the suspended concave.

FIG. 5 shows the suspended concave 104, with the inlet side 100 and outlet side 101. It shows that the concave has four sections in this example shared by single rotor, but they are all controlled by the same actuators, with a pair of vertical rods for the inlet side and a pair of vertical rods for the outlet side. The multiple concave sections are connected by side rails. The crop flow is shown as arrow 220.

During harvesting, material entering the space between the concave and the threshing rotor (with a size set depending on the crop and harvest conditions) will exert a downward force Fy (as shown in FIG. 3) on the concave (and an upward force on the rotor). This force is converted to a torque T acting on the rotary control shaft and in response a force Fx is applied to the actuator 200 to counteract the force Fy.

If the hydraulic piston cylinder has no capacity to move quickly, to dampen the force Fx, the system may be considered to be rigid, with the result that the strain remains on the system and will damage its components, in particular the the rotary control shaft.

Thus, large debris can cause damage to the combine harvester. It is therefore desirable to release the concave (i.e. increase the spacing to the rotor) to allow the debris to be expelled from the threshing system.

The invention provides a spring arrangement to buffer the force Fx. This avoids the need to provide buffers for the force Fy on each support arm, and thus it is easier to ensure that the concave has a same uniform clearance from the rotor, or that multiple concaves connected in a line have the same clearance from the rotor.

The invention in particular provides a modification to the arrangement of FIG. 3 in which a compact spring arrangement is provided in series with the actuator 200, hence either between the rotary control shaft and the actuator cylinder, or between the actuator cylinder and a fixed mounting, i.e., the combine chassis.

Figure 6:
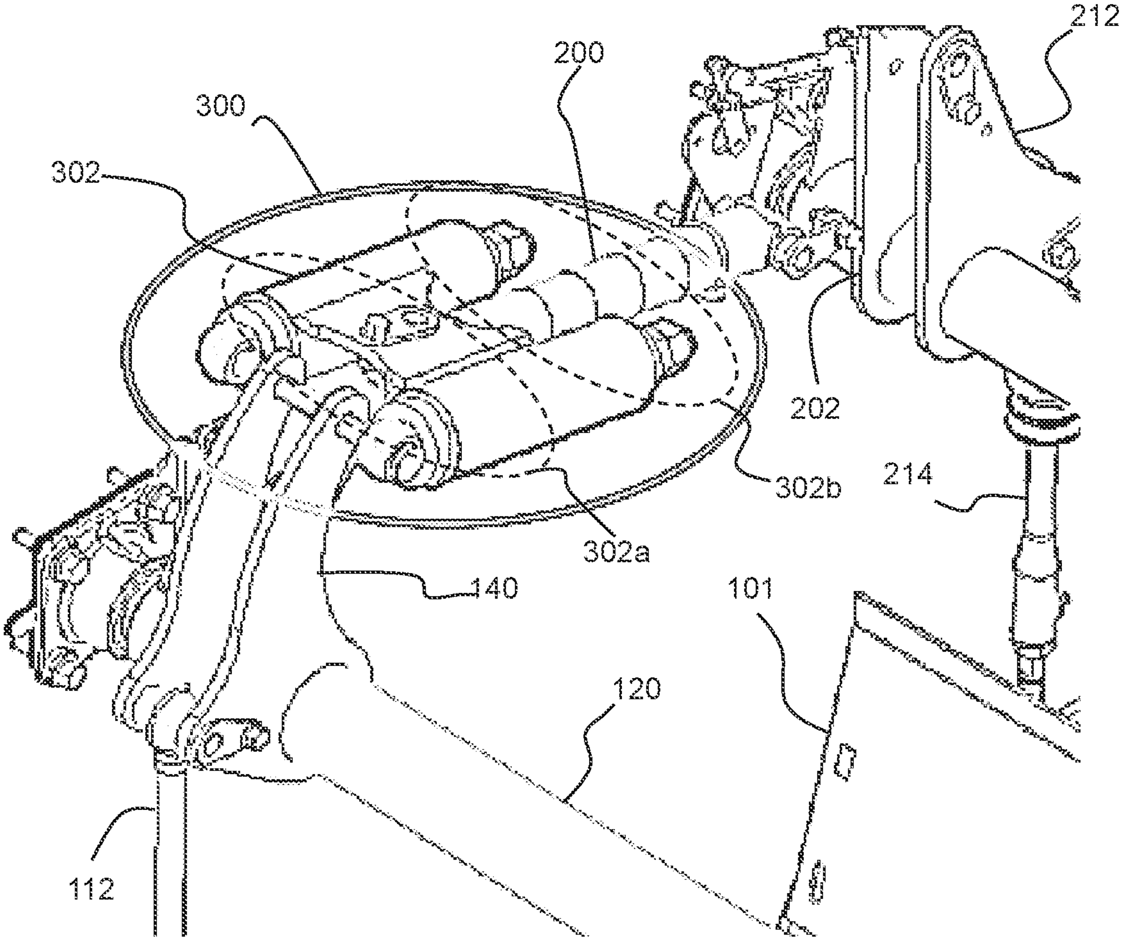
FIG. 6 shows one example of a spring arrangement applied to the control mechanism of FIG. 3.

FIG. 6 shows an example of the modification to FIG. 3 by providing a spring arrangement 300 between the rotary control shaft 120 and the hydraulic cylinder actuator 200. It shows the rotor removed to make the the image clearer.

The spring arrangement 300 comprises a spring housing 302 which houses the at least one spring. The spring housing has a first end 302*a* connected to one end of the hydraulic piston, and a first end of the spring is at that first end of the spring housing. A coupling rod extends from the opposite, second, end of the spring (at the second end 302*b* of the spring housing) through the spring back to the first end 302*a* of the spring housing. The coupling rod connects to the rotary control shaft via the crank 140 at that first end.

This arrangement is compact because the connections to the crank 140 and to the hydraulic cylinder are at the same location (i.e. the same, first end 302*a* of the spring housing). The spring within the spring housing thus extends alongside the hydraulic cylinder. The "first end" 302*a* is not intended to be limited to the extreme end, but is intended to represent a first half of the length of the spring housing.

The crank 140 is a shared crank in that the a concave support arm 112 and the spring arrangement both connect to the rotary control shaft at the crank 140.

In the example show in FIG. 6, the spring arrangement comprises two springs in parallel with each other, on opposite sides of the actuator hydraulic piston, each housed within the spring housing.

Figure 7:
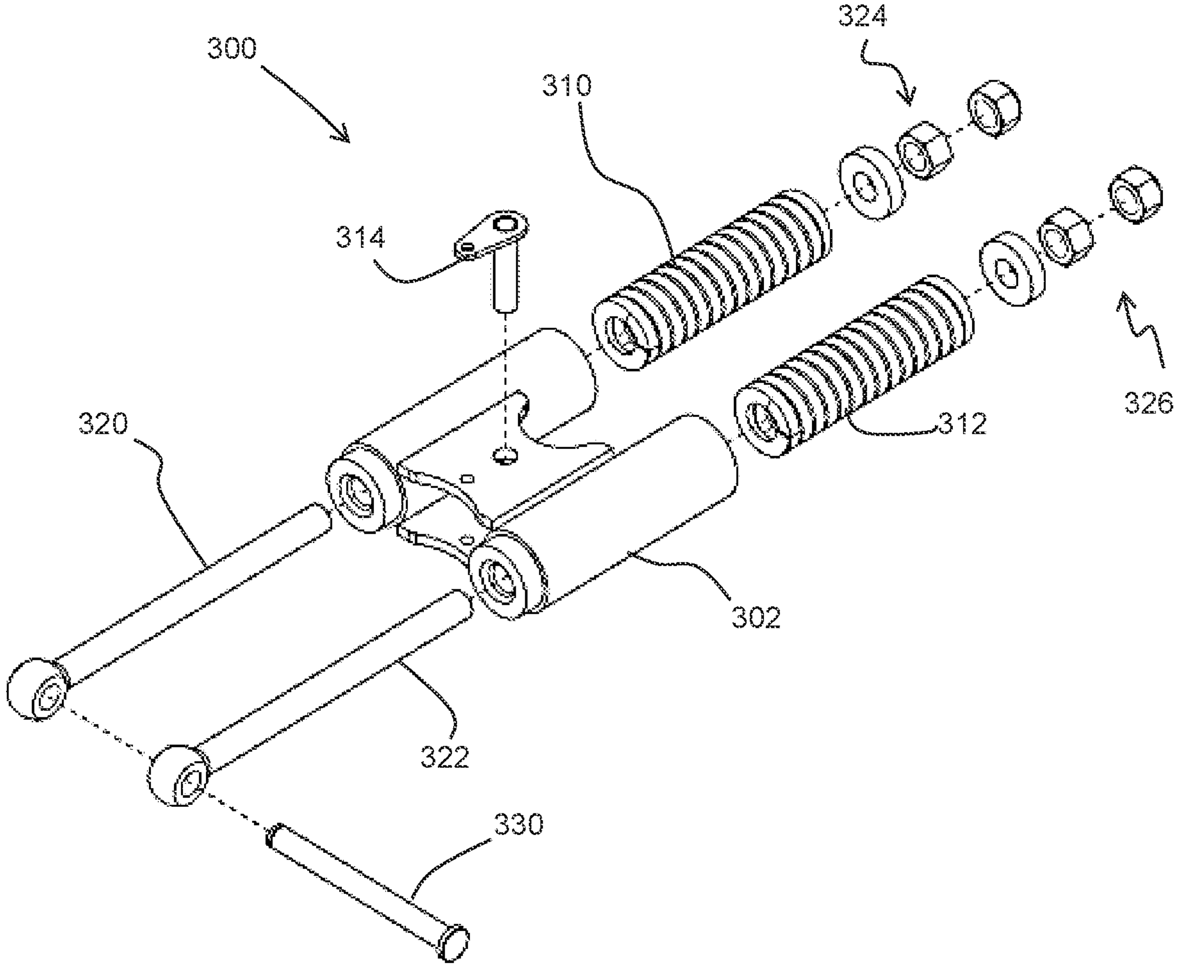
FIG. 7 shows the spring arrangement in more detail.

FIG. 7 shows the spring arrangement 300 in more detail, as an exploded view. The spring housing 302 houses two springs 310, 312 side-by-side. A connector 314 couples the one end 302*a* of the spring housing (between the springs) to an end of the hydraulic actuator. The springs extend back along the sides of the hydraulic actuator. The coupling rods 320, 322 are shown, with stops 324, 326 at the ends which act as seats for the springs. The coupling rods extend along the length of the springs, through the central cavities of the coil springs. The coupling rods are in the form of eyebolts, and the eyes connect to the crank by means of a connecting pin 330.

The springs allow relative movement between the connecting pin 330 and the connector 314. In this example, a downward force on the concave will pull on the coupling rods and thereby compress the springs if the connector 314 remains at the same place (because the hydraulic piston is effectively locked).

Figure 8:
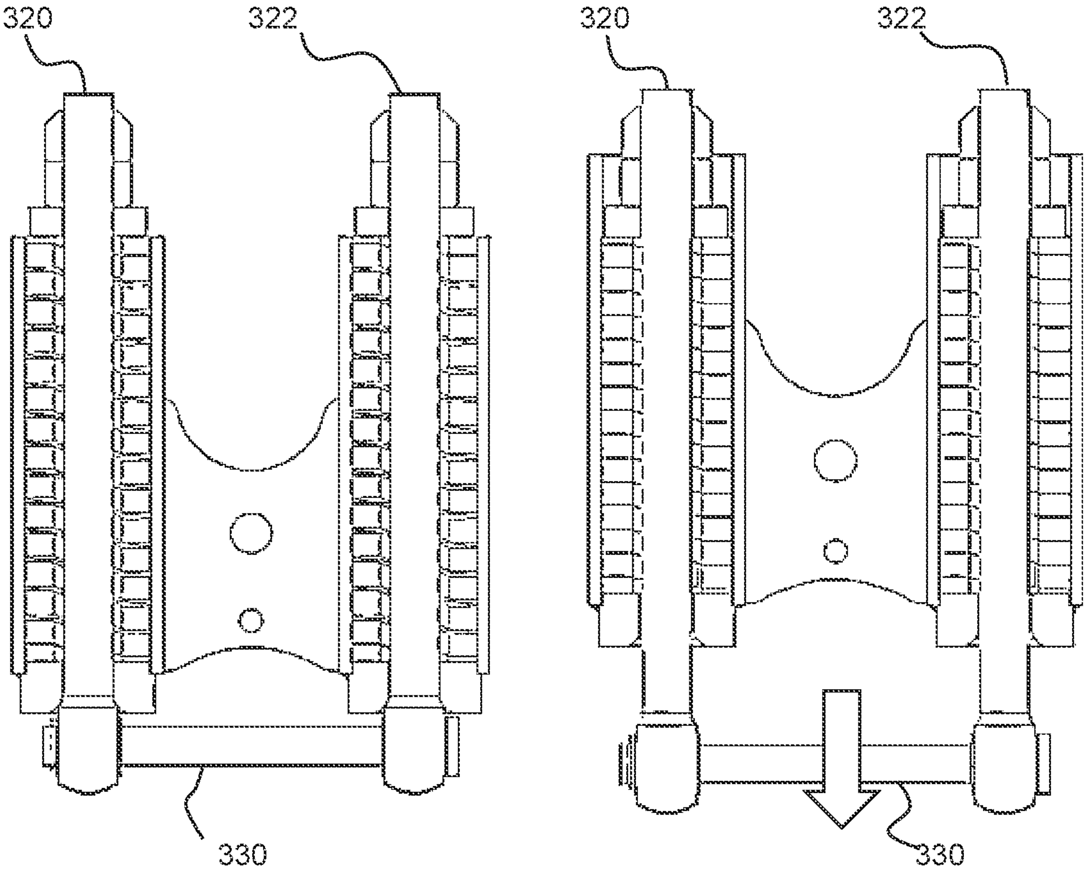
FIG. 8 shows the spring arrangement in a normal position and when actuated by a foreign object during harvesting.

FIG. 8 shows the normal relaxed state on the left and the state when a pulling force has been applied to the coupling rods.

The example above has the spring arrangement at the inlet side of the concave. There may be spring arrangements at the inlet and outlet sides.

The example above is also for a single rotor design. There may be two rotors side-by-side. In such a case, there may be a center, inner rail, shared between the side-by-side concaves, and outer rails. The outer rails are the inlet sides of both concaves (because the two rotors rotate in opposite directions) and the inner rail is the outlet side of both concaves.

Figure 9:
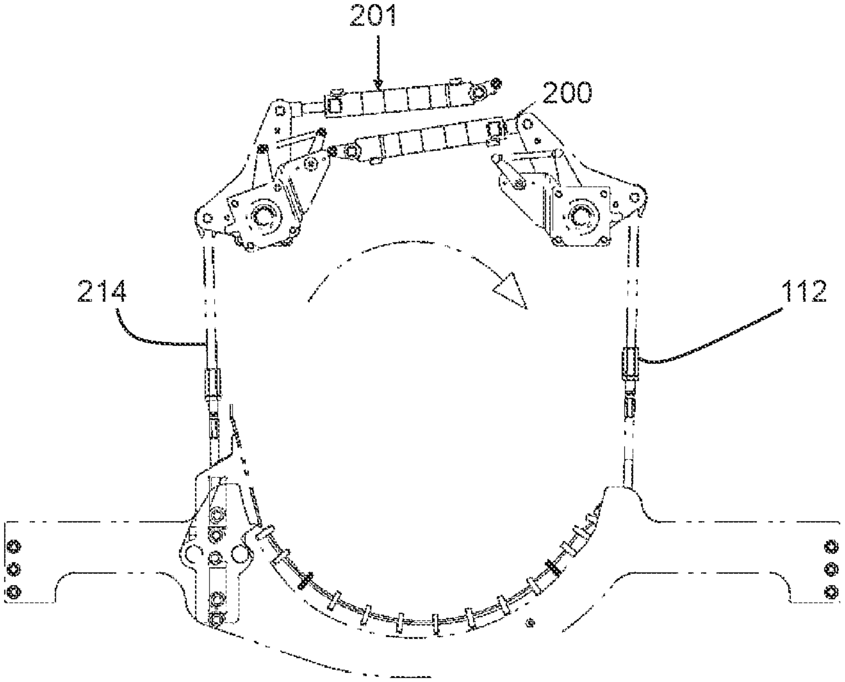
FIG. 9 shows an single rotor arrangement.
Figure 10:
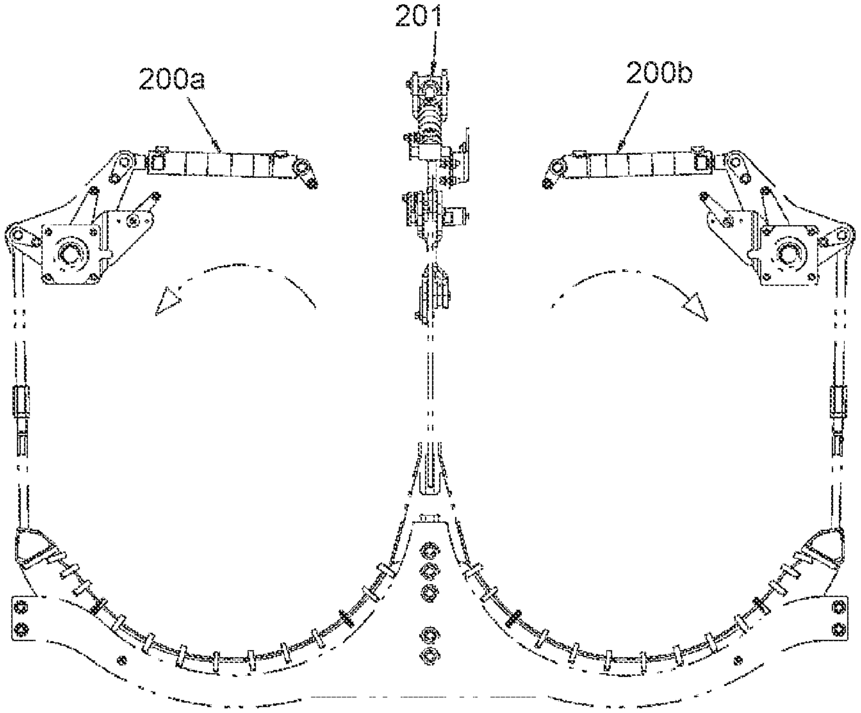
FIG. 10 shows a dual rotor arrangement.

FIG. 9 shows a single rotor design, with the actuators 200, 201 for the inlet and outlet sides. FIG. 10 shows a twin rotor design, with counter-rotating rotors, and first and second inlet side actuators 200*a*, 200*b* and an outlet side actuator 201 connected to a shared rail between the two concaves.

The release unit described above thus functions as an inline safety system that acts directly on the rotary control shaft. It does not need to be reset, since it simply provides damping when needed, in particular when a force is experiences which exceeds a threshold sufficient to compress (or in a different configuration extend) the spring or springs of the spring arrangement. The unit has a rapid response to the external force and hence can protect the system more effectively than more complex safety mechanisms. The springs can easily be replaced as needed to guarantee the correct deflection and force. A mechanical stop can be provided to limit the maximum spring deflection. The system may be used in combination with other release systems, such as providing an accumulator in the hydraulic cylinder actuators. Different spring designs may be used for different use cases.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

Any reference signs in the claims should not be construed as limiting the scope.

All references cited herein are incorporated herein in their entireties. If there is a conflict between definitions herein and in an incorporated reference, the definition herein shall control.

What is claimed is:

1. An adjustment and release unit for supporting a concave beneath a threshing unit of a combine harvester, the adjustment and release unit comprising:

a rotary control shaft;

an actuator for controlling an angular position of the rotary control shaft, wherein the actuator comprises a hydraulic piston;

a set of concave support arms, which extend downwardly from the rotary control shaft to the concave, wherein an angular orientation of the rotary control shaft determines a depth of the concave beneath the adjustment and release unit; and a linkage between the rotary control shaft and a mounting point, the linkage incorporating the actuator, wherein the linkage further comprises a spring arrangement in series with the actuator for releasing the concave in response to foreign objects entering the threshing unit against a spring bias of the spring arrangement, wherein the spring arrangement is between the rotary control shaft and the actuator or is between the actuator and the mounting point and wherein the spring arrangement comprises at least one spring positioned parallel with, and to the side of, the hydraulic piston.

2. The unit of claim 1, wherein there are at least two concave support arms for supporting the concave across its length.

3. The unit of claim 1, wherein the spring arrangement comprises a spring housing which houses the at least one spring, wherein the spring housing has a first end connected to one end of the hydraulic piston, wherein, for the or each spring, a coupling rod extends through the spring to the first end of the spring housing, and the coupling rod connects to the rotary control shaft at the first end of the spring housing.

4. The unit of claim 1, wherein the linkage and one of the concave support arms both connect to the rotary control shaft at a shared crank.

5. The unit of claim 1, wherein the spring arrangement comprises two springs in parallel with each other.

6. A threshing system for a combine harvester, comprising:

a threshing unit;

a concave beneath the threshing unit;

the adjustment and release unit of claim 1 for supporting the concave beneath the threshing unit.

7. A combine harvester comprising:

a crop cutting head;

the threshing system of claim 6; and a grain cleaning system for receiving the cut and threshed crop material.

* * * * *